(12) United States Patent
Damsi

(10) Patent No.: US 8,172,477 B2
(45) Date of Patent: May 8, 2012

(54) ALUMINUM CORNER CASTING IN TARPING SYSTEMS

(75) Inventor: Everest Damsi, Waterdown (CA)

(73) Assignee: Roll-Tite Corp., Ontario (CA)

( * ) Notice: Subject to any disclaimer, the term of this patent is extended or adjusted under 35 U.S.C. 154(b) by 0 days.

(21) Appl. No.: 12/995,799

(22) PCT Filed: Jun. 2, 2009

(86) PCT No.: PCT/CA2009/000753
§ 371 (c)(1),
(2), (4) Date: Jan. 10, 2011

(87) PCT Pub. No.: WO2009/146533
PCT Pub. Date: Dec. 10, 2009

(65) Prior Publication Data
US 2011/0091271 A1    Apr. 21, 2011

Related U.S. Application Data

(60) Provisional application No. 61/058,133, filed on Jun. 2, 2008.

(51) Int. Cl.
*F16B 1/00* (2006.01)
(52) U.S. Cl. ........................ 403/205; 403/295
(58) Field of Classification Search .................. 403/205, 403/295, 382, 403
See application file for complete search history.

(56) References Cited

U.S. PATENT DOCUMENTS

| 2,066,227 | A | * | 12/1936 | Reukauf, Jr. et al. | 160/81 |
| 3,000,656 | A | * | 9/1961 | Hollaender | 403/298 |
| 3,218,097 | A | * | 11/1965 | Bowers et al. | 403/295 |
| 4,509,778 | A | * | 4/1985 | Arnoldt | 285/406 |
| 4,636,105 | A | * | 1/1987 | Johansson | 403/205 |
| 4,864,795 | A | * | 9/1989 | Burg | 52/646 |
| 4,902,064 | A |   | 2/1990 | Tuerk et al. | |
| 5,069,484 | A | * | 12/1991 | McElroy | 285/39 |

(Continued)

FOREIGN PATENT DOCUMENTS

CA    1247366 A1    12/1988

OTHER PUBLICATIONS

U.S. Appl. No. 11/754,828, to Lowry, filed May 29, 2007.

(Continued)

*Primary Examiner* — Victor MacArthur
(74) *Attorney, Agent, or Firm* — Scully, Scott, Murphy & Presser, P.C.

(57) ABSTRACT

A bracket is provided for a bow. The bracket connects a header and a jamb. The bracket has a pair of end faces disposed generally orthogonal to one another with one end face abutting the header and the other abutting the jamb; and a pair of tongues extending from said end faces for engagement with end sockets formed in the ends of the header and jamb. The bracket is formed in two pieces arranged face to face along a medial plane extending between the end faces and held together by a fastener extending through a radial web that connects the end faces. Each said tongue is provided with at least one aperture therethrough alignable with similar apertures formed through the end sockets of the headers and jambs whereby a fastener can pass through the aligned apertures in a socket having a tongue inserted therein and fastened, to secure the components to one another.

14 Claims, 4 Drawing Sheets

U.S. PATENT DOCUMENTS

| | | | |
|---|---|---|---|
| 5,080,423 A | | 1/1992 | Merlot et al. |
| 5,165,730 A | * | 11/1992 | McElroy ........................ 285/39 |
| 5,421,666 A | * | 6/1995 | Spears .......................... 403/176 |
| 5,538,313 A | | 7/1996 | Henning |
| 5,873,210 A | | 2/1999 | Brumleve |
| 5,934,735 A | | 8/1999 | Wheatley |
| 6,634,823 B2 | * | 10/2003 | Sciortino ....................... 403/13 |
| 6,663,312 B2 | * | 12/2003 | Cary et al. ..................... 403/69 |
| 7,344,178 B2 | | 3/2008 | Lowry et al. |
| D626,405 S | * | 11/2010 | Goad ............................. D8/382 |
| 7,967,522 B2 | * | 6/2011 | Goad ............................. 403/292 |
| 2007/0086852 A1 | * | 4/2007 | Goad ............................. 403/292 |
| 2008/0217953 A1 | | 9/2008 | Beshiri |

OTHER PUBLICATIONS

International Search Report dated Aug. 20, 2009.

* cited by examiner

ALUMINUM CORNER CASTING IN TARPING SYSTEMS

CROSS-REFERENCE TO RELATED APPLICATIONS

The present application is based upon and claims the benefit of priority from prior U.S. Provisional Patent Application No. 61/058,133 filed on Jun. 2, 2008; the entire contents of which are incorporated herein by reference.

FIELD OF THE INVENTION

The present invention relates to the field of tarps for covering vehicle beds. In particular, it relates to connectors used for securing the tarps to the vehicle.

BACKGROUND OF THE INVENTION

Shipping of goods, both regionally and internationally, is conducted by several means, including rail, ship and, very often, truck. While container trucks or truck-trailer combinations are used, particularly in conjunction with rail or ship container shipping, in many places and situations, a standard flatbed truck is used. In order to protect the shipped goods from exposure to the elements, they are typically covered with tarps. In order to ensure optimal shipping conditions, a system of securing the tarps to the flatbed is required. Generally, a series of frames (known as "bows") are attached to the flatbed and then one or more tarps are attached to the bows to create an enclosed, roughly cuboid cargo area. The most common currently known means of securing the tarps to the bows involves flaps on the tarp which overlap the bow, generally using Velcro™ or similar means. The tarp is required to be modified to include the flaps, and after repeated use the flaps do not secure as well, suggesting a need for an improved method of securing the tarps.

U.S. Pat. No. 4,902,064 issued to Tuerk et al. discloses a Conestoga-style tarp system using bows which are attached to guide rails attached to the sides of the vehicle flatbed. The rearmost bow is designed to be tilted or leaned to provide tension to the tarp and to secure the bow. The tarp is a single tarp which is extended over the bows and supported by the tension created by the positioning of the rearmost bow. The Tuerk tarp system does not disclose any use of multiple tarps, nor any means of securing the tarp to the individual bows.

U.S. Pat. No. 5,538,313 issued to Henning discloses a tarp system for a flatbed trailer including three sets of bow members (front, intermediate, rear) for supporting the tarp. The bow members are slidably mounted to guide rails running along the sides of the flatbed, thus enabling the bow members to be moved to different locations on the flatbed and for the entire assembly to be compressed or expanded as required to load and unload the vehicle. Helming is a modified version of the Tuerk system and is similarly design around a single tarp supported by tension created by bow positioning. There is no disclosure of any system using multiple tarps or any means of securing the tarps to individual bows.

U.S. Pat. No. 5,080,423 issued to Merlot et al. discloses a segmented tarp cover system. The Merlot tarp is designed as a series of segmented tarp pieces which are extended to cover the top of a cargo container, such as a rail car of truck trailer. The Merlot system is designed solely for a top covering and does not disclose any means or method of covering the sides and ends of a cargo container or surface.

All the disclosed systems require the addition of guide rails or an equivalent element to the flatbed to support the bows. Not all flatbeds are capable of having guide rails secured to them, nor is it desirable in all circumstances to have guide rails secured to the flatbed. The addition of guide rails either increases the width of the flatbed, risking violation of regulations or takes away available cargo space from the flatbed, making it less efficient.

Even when the installation of the guide rails and bows is monitored to ensure compliance with width regulations, it is still common to have the tarp attachment means (flaps, buckles, etc.) on the exterior. These means may then extend beyond the legal width permitted for the cargo bed, and the driver/operator may not even be aware of the violation. Thus, there is a need for a tarp connector system without external tarp attachment means to ensure compliance with legal restrictions on vehicle width.

The above patents are illustrative of the limitations in the known art. In addition to the above-noted limitations, the corners of the bow protrude into the interior of the cargo area, reducing the amount of available space and imposing restrictions on loading. Similarly, the tarp attachments protrude into the interior, affecting the cargo capability in the same way as the bow corners. Alternatively, they are exposed on the exterior, making them vulnerable to the elements or to theft and vandalism, and at risk of coming detached and exposing the cargo.

U.S. Pat. No. 7,344,178 to Lowry discloses a system for mounting bows to tracks carried by the trailer. The bows in Lowry are formed from a pair of headers connected to a jamb by corner brackets. The corner bracket is secured to each of the jambs and header by a tongue and socket connection with fasteners passing through the overlapping portions of the tongue and socket. In this way the bow is modular and may be shipped in a dismantled state and assembled in situ. The connection between the headers and jambs provides shoulders to enhance the rigidity of the connection and withstand the rigours of the environment in which the bows must operate.

The bracket in Lowry is formed from an extrusion such that its end faces are planar. Cover plates are secured to the end faces to enclose the bracket and tarp retainers are mounted to the exterior surface of the bracket and along the header and jambs. The number of components used in the Lowry design therefore increases the assembly time and complexity. Moreover, the tongue provided in Lowry is formed from a pair of cantilevered leaves and in practice it has been found that these may flex with the loads imposed on the bow.

U.S. patent application Ser. No. 11/754,828, the contents of which are incorporated herein by reference, discloses a tongue in which the cantilevered leaves are connected to provide an open box structure. This arrangement enhances the stiffness of the tongue. It is found however that the loads imposed on the bow are such that fore and aft swaying motion may still cause some flexure at the connection of the bracket to the headers and jambs.

It is an object of this invention to obviate or mitigate the above disadvantages.

SUMMARY OF THE INVENTION

In general terms, the present invention provides a connection for the horizontal and vertical tubes of the bow. The connecting is achieved through two casting corners, that are inserted into the tubing to create a bow and fastened through the use of nuts and bolts. Both half corners are identical and symmetrical.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE PREFERRED EMBODIMENTS

Figure 1:
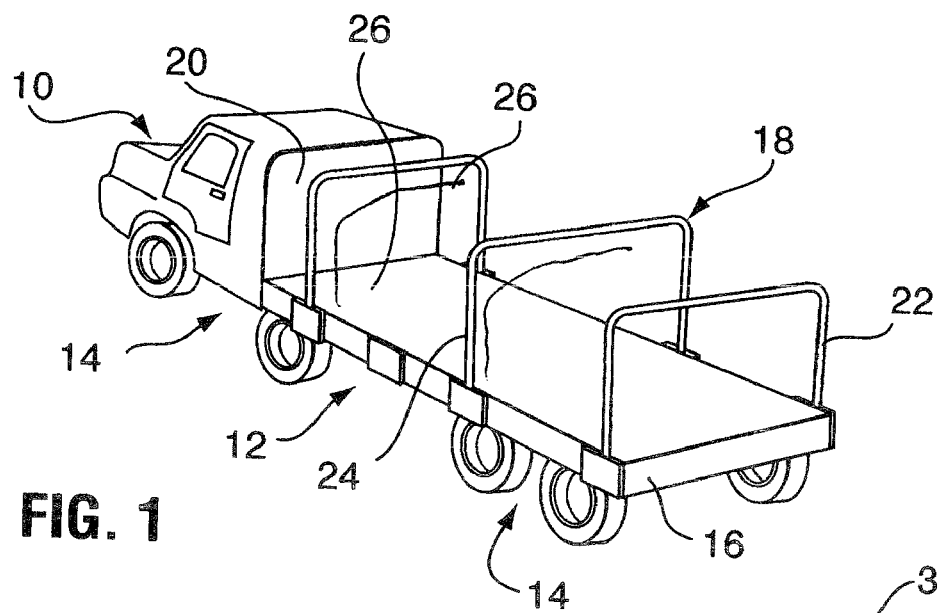
FIG. 1 is a schematic representation of a truck with a tarp covering.
Figure 2:
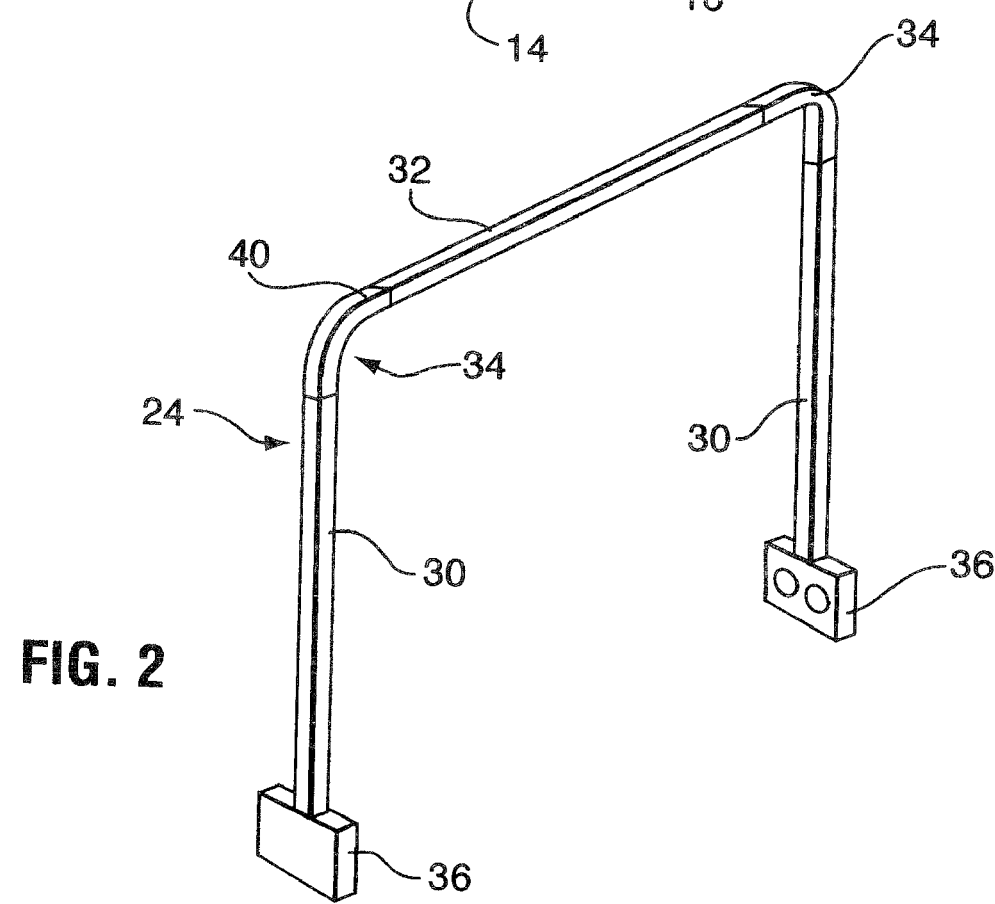
FIG. 2 is an enlarged view of a bow used on the truck of FIG. 1.

Referring therefore to FIG. 1, a tractor 10 is connected through a conventional fifth wheel to a trailer 12, both of which are supported on respective axle assemblies 14. The trailer 12 includes a trailer bed 16 that is formed in a conventional manner with a structural steel frame and decking. The trailer bed is typically between 45 and 60 feet long and designed to carry a variety of goods.

The bed 16 is covered by a canopy structure 18 that is secured to the bed 16. The canopy 18 includes a headboard 20, a rear bow structure 22 and intermediate bow structures 24 spaced between the headboard 20 and the rear bow 22. Sections of flexible covering 26 extend between the bows to provide a continuous, weatherproof canopy over the bed 16.

The bows 22, 24 are slidable relative to the trailer bed 16 as will be described more fully below, to allow the canopy 18 to be retracted and expose the trailer bed 16. To protect goods supported on the bed 16 during transit, the canopy 18 may be deployed providing a secure weather tight canopy for the goods.

The bow 24 has a pair of vertical jambs 30 interconnected by a header 32. The jambs 30 and header 32 are interconnected by respective corner assemblies 34 and the lower ends of each of the jambs are supported on respective trucks 36. The trucks 36 support the intermediate bows to permit longitudinal movement relative to the trailer bed 16.

Figure 3:
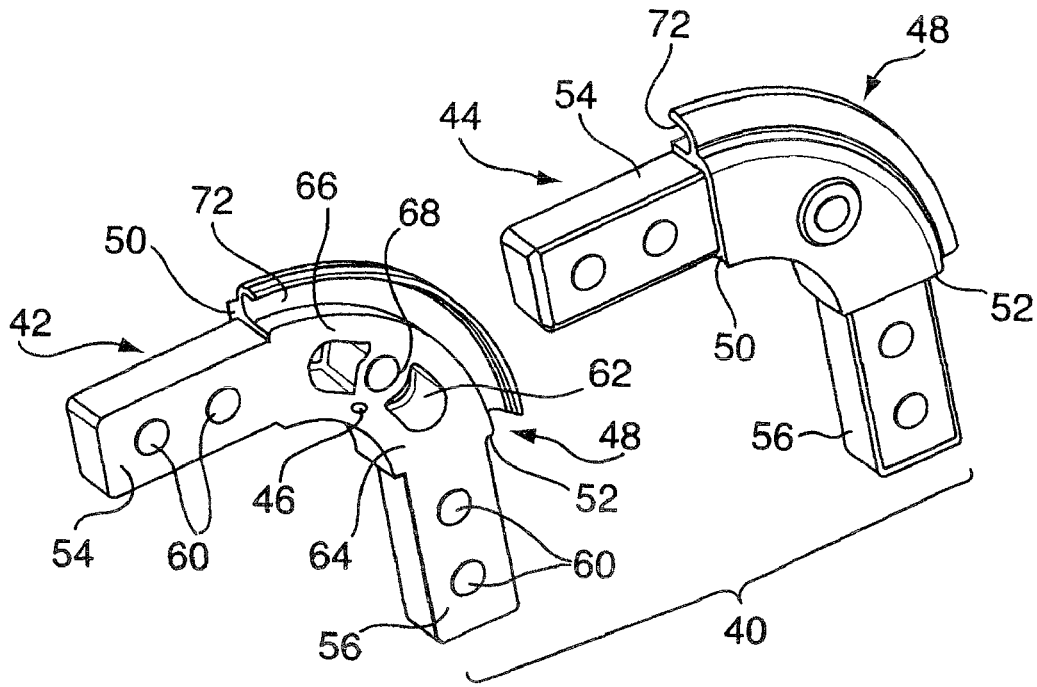
FIG. 3 is a perspective view of two parts of a bracket used in the bow of FIG. 2.
Figure 4:
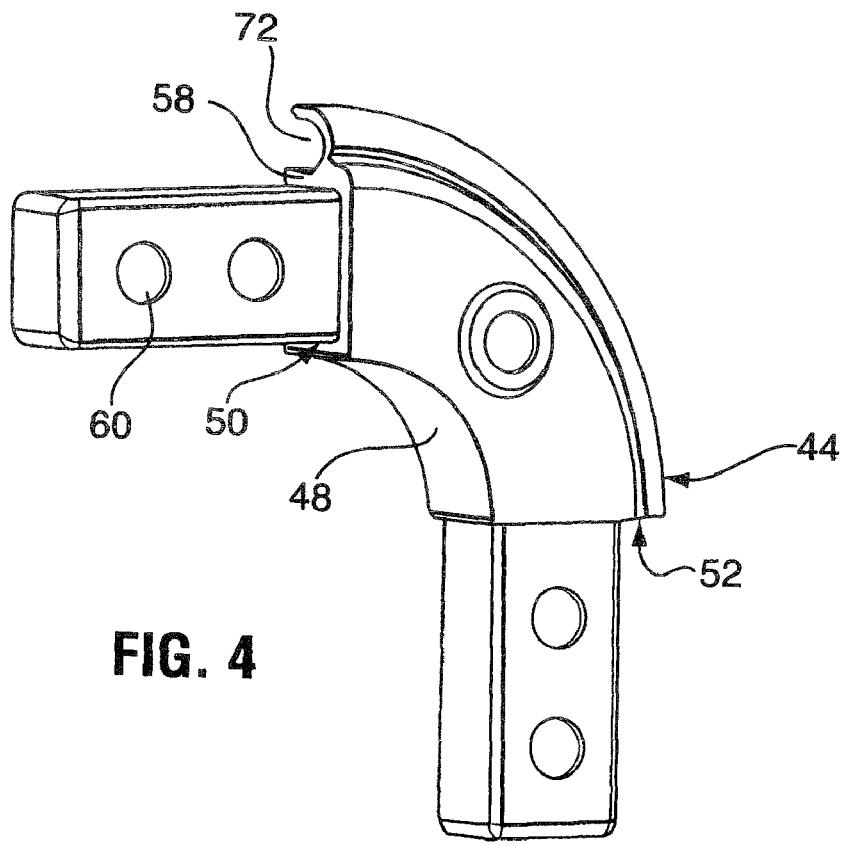
FIG. 4 is a perspective view of a one of the parts shown in FIG. 3.

The corner assembly 34 includes a bracket 40 to connect a jamb 30 and a header 32. The details of the bracket 40 can best be seen in FIG. 3. The bracket 40 is formed as two parts 42,44 that are mirror images of each other and abut on a medial plane defined by a planar face 46. Each part is formed by a pressure die casting process from an aluminum alloy material.

Each part 42,44 has a curved body 48 with a pair of end faces 50,52 disposed orthogonally to one another. In at least one embodiment, the radius of curvature of the body falls within the range of 3 to 5 inches. Tongues 54,56 extend from respective end faces 50,52, and are reduced in cross section to provide a shoulder 58 between the body 48 and the tongue 54,56. The shoulder 58 extends around the tongue on all faces except the planar face 46. In other words, shoulder 58 extends outwardly from an inner edge of planar face 46 around the tongue to an outer edge of planar face 46.

A pair of holes 60 is formed in each tongue 54, 56 to receive fasteners as will be described more fully below. A central zone of the body 48 is formed with an arcuate cavity 62 to define inner and outer webs 64, 66 and a radial rib 68 extends between the webs 64, 66 midway between the end faces 50, 52. A hole 70 passes through the rib 68 to accommodate a fastener to secure the two parts 42, 44 to one another.

The outer arcuate surface of the body 48 is formed with an open part circular channel 72 that faces the planar face 46 but is offset from it. The channel 72 is dimensioned to receive a tarp and pole to secure the tarps to the bow 24.

The bracket 40 is assembled by placing planar faces 46 of the two parts 42, 44 in abutment so that the holes 70 and the end faces 50, 52 on each part are aligned. A fastener 74 is passed through the holes 70 to hold the two faces together. A bolt and vibration resistant nut is typically used as the fastener 74. With the bracket assembled, the channels 72 face each other and define a re-entrant passage to receive the tarp and pole. The offset of the channel 72 from the face 46 provides a gap between the channels sufficient to accommodate the tarps but inhibit removal of the poles.

The jambs 30 and header 32 are each formed from lengths of a hollow extrusion having an external profile matching that of the bracket 40. One side of the extrusion is provided with a re-entrant passage matching that provided by the two channels 72 but with a central rib 76 to further secure the tarp and pole in the passage. The internal profile of the extension is a close fit over the tongues 54, 56 to provide a socket in to which the tongue is snugly received. Each of the jambs 30 and header 32 has a pair of holes 78 that are positioned to align with holes 60 when the bow is assembled with the ends of the jambs and header against the shoulder 58.

Figure 5:
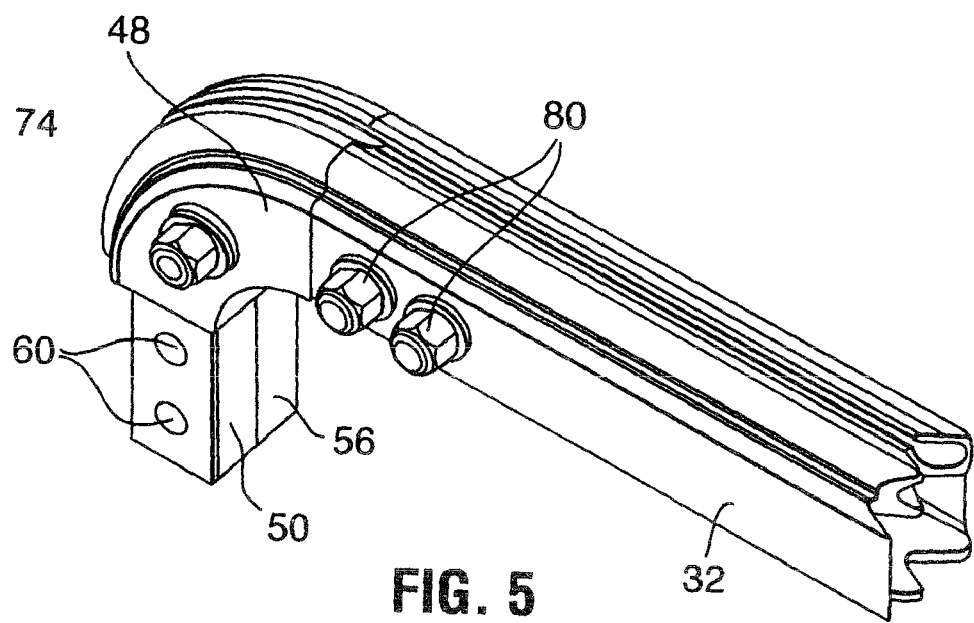
FIG. 5 is a perspective view of a connection between a header and bracket in the bow of FIG. 2.
Figure 6:
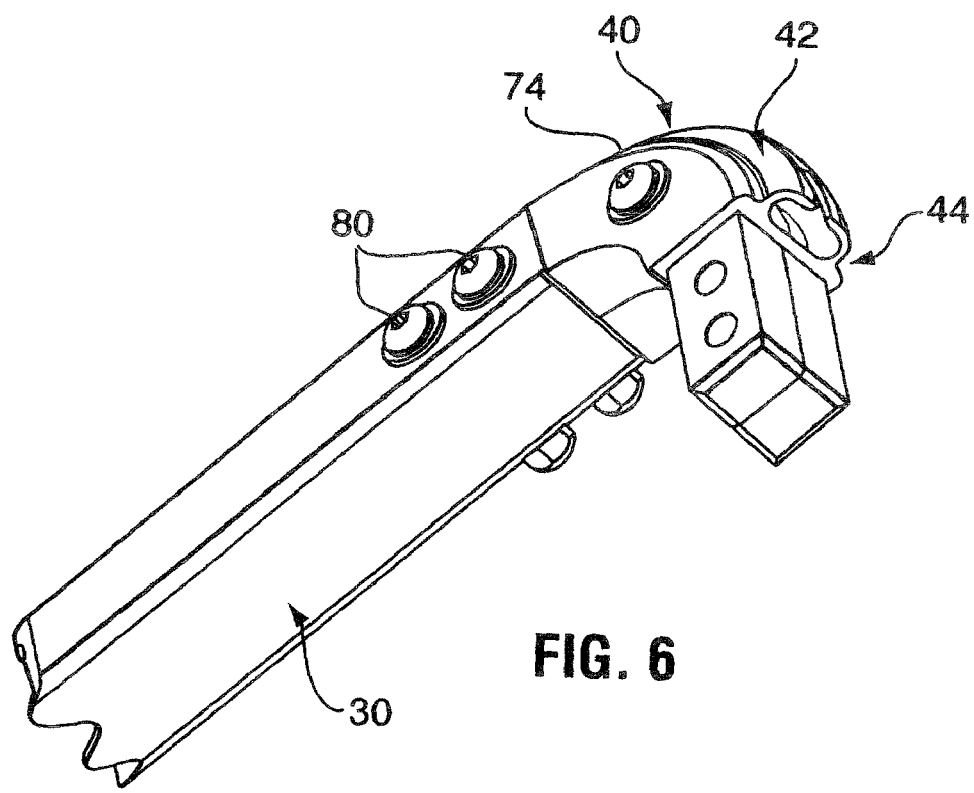
FIG. 6 is a perspective view of a connection between a jamb and bracket used in the bow of FIG. 2; and, FIG. 7 is a view, similar to FIG. 5 showing one of the parts of the bracket.
Figure 7:
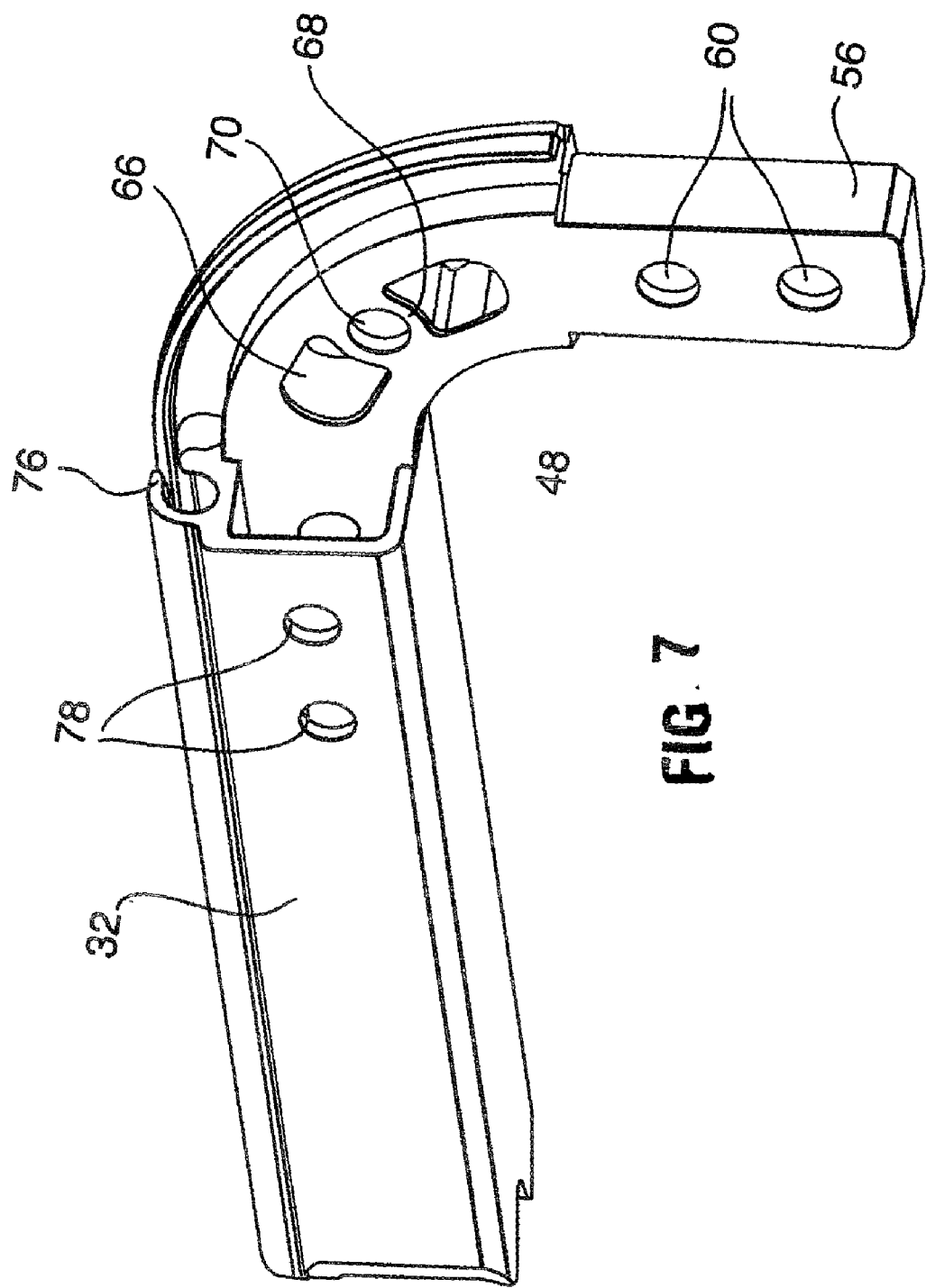

As can be seen in FIGS. 5 and 6, the tongues 54,56 are inserted in to the interior of the jambs 30 and header 32 until the shoulders abut the ends of the jamb or header. Fasteners, typically bolts 80 are inserted through the holes 70 and 60 to secure the bracket 40. In this position, the ends of the jambs and header abut the shoulders around the entire circumference of the tongue and therefore provide support in all directions of flexure. With the bracket 40 connecting the jambs 30 and header 32, the bow is assembled and can be placed on the rails. It will be noted that a simplified assembly is provided by integrally forming the channels on the body and rigidity enhanced by the provision of the continuous shoulder.

I claim:

1. A corner bracket for a bow in a transportation canopy structure where the canopy structure has one or more tarps and the bow comprises a spaced pair of jambs and a header, the corner bracket comprising:

two separate and cooperating bracket parts that are mirror images of one another about a medial plane of the corner bracket, each bracket part defining a face, the two parts being joinable together to form the corner bracket by bringing the faces of the two parts into abutment, each bracket part comprising:

a body defining a first end face and a second end face opposite the first end face, the end faces being substantially orthogonal to one another, an outer edge of the body defining a channel facing the face of the bracket part such that when the two bracket parts are joined together the channels of each bracket part cooperate to define a re-entrant passage for receiving a portion of the one or more tarps; and a first tongue extending from the first end face and a second tongue extending from the second end face of the body, wherein the first tongues and the second tongues of the corner bracket are adapted to be received in an end of a said jamb and in an end of the header of the bow to connect a said jamb and header together.

2. The corner bracket of claim 1 wherein each bracket part further comprises a first shoulder disposed where the first tongue meets the body and a second shoulder disposed where the second tongue meets the body.

3. The corner bracket of claim 2 wherein the circumference of each of the first and second tongues is smaller than the circumference of the body, and the first and second shoulders are defined by the first and second end faces of the body.

4. The corner bracket of claim 3 wherein each of the first and second shoulders of each bracket part extends in a circumferential direction around the bracket part from an inner edge of the face outwardly around its respective tongue to an outer edge of the face.

5. The corner bracket of claim 1 wherein a central portion of the body of each bracket part defines an arcuate cavity region, the arcuate cavity region defining an inner web and an outer web in the body.

6. The corner bracket of claim 5 further comprising a radial rib extending between the inner and outer webs in a central region of the arcuate cavity region.

7. The corner bracket of claim 1 wherein the body of each bracket part has a curved shape.

8. The corner bracket of claim 7 wherein the radius of curvature of the body falls within the range of 3 to 5 inches.

9. The corner bracket of claim 1 wherein the body of each bracket part defines an opening therethrough, such that when the two bracket parts are joined together the openings are in alignment for receiving a fastener for securing the two parts together.

10. The corner bracket of claim 1 wherein the first and second tongues of the bracket parts each define at least one tongue opening therethrough, such that when the two bracket parts are joined together the tongue openings in each bracket part are in alignment for receiving a fastener for securing the corner bracket to a said jamb and the header of the bow.

11. The corner bracket of claim 10 wherein the number of tongue openings in each tongue of the bracket parts is two.

12. The corner bracket of claim 1 wherein the corner bracket is made of aluminum.

13. The corner bracket of claim 1 wherein the corner bracket is made of an aluminum alloy.

14. The corner bracket of claim 1 wherein at least one of a said jamb and the header of the bow comprises a re-entrant passage, and wherein the re-entrant passage of the corner bracket is in alignment with the re-entrant passage of the at least one of a said jamb and the header when the corner bracket is connected to the at least one of a said jamb and the header.

\* \* \* \* \*